United States Patent
Lin et al.

(10) Patent No.: US 9,303,213 B2
(45) Date of Patent: Apr. 5, 2016

(54) PROCESS FOR PRODUCING RENEWABLE BIOFUEL FROM A PYROLYZED BIOMASS CONTAINING BIO-OIL STREAM

(75) Inventors: Ronny W. Lin, Sugar Land, TX (US); Lorenz J. Bauer, Pasadena, TX (US)

(73) Assignee: KiOR, LLC, Pasadena, TX (US)

( * ) Notice: Subject to any disclaimer, the term of this patent is extended or adjusted under 35 U.S.C. 154(b) by 577 days.

(21) Appl. No.: 13/553,742

(22) Filed: Jul. 19, 2012

(65) Prior Publication Data

US 2014/0020281 A1  Jan. 23, 2014

(51) Int. Cl.
| | |
|---|---|
| C10L 1/02 | (2006.01) |
| C10G 1/06 | (2006.01) |
| C10G 3/00 | (2006.01) |
| C10G 31/09 | (2006.01) |
| C10L 1/06 | (2006.01) |

(52) U.S. Cl.
CPC ...... *C10G 3/50* (2013.01); *C10G 31/09* (2013.01); *C10L 1/06* (2013.01); *C10G 2300/1011* (2013.01); *C10G 2300/301* (2013.01); *C10G 2300/4081* (2013.01); *C10G 2400/02* (2013.01); *Y02P 30/20* (2015.11)

(58) Field of Classification Search
USPC ........................................... 44/307; 585/240
See application file for complete search history.

(56) References Cited

U.S. PATENT DOCUMENTS

| | | | |
|---|---|---|---|
| 4,209,647 A | 6/1980 | Gallivan et al. | |
| 4,795,841 A | 1/1989 | Elliott et al. | |
| 4,942,269 A | 7/1990 | Chum et al. | |
| 5,258,117 A | 11/1993 | Kolstad et al. | |
| 5,312,543 A | 5/1994 | Taylor et al. | |
| 6,409,912 B1 | 6/2002 | Wallace et al. | |
| 7,816,570 B2 | 10/2010 | Roberts, IV et al. | |
| 8,022,260 B2 | 9/2011 | O'Connor et al. | |
| 8,057,641 B2 | 11/2011 | Bartek et al. | |
| 8,110,090 B2 | 2/2012 | Zimmerman et al. | |
| 8,168,840 B2 | 5/2012 | Brady et al. | |
| 8,183,422 B2 | 5/2012 | Alegria et al. | |
| 8,557,193 B2 | 10/2013 | Bartek et al. | |
| 2009/0250376 A1* | 10/2009 | Brandvold et al. | 208/17 |
| 2009/0301930 A1 | 12/2009 | Brandvold et al. | |
| 2010/0083566 A1 | 4/2010 | Fredriksen et al. | |
| 2010/0280301 A1 | 11/2010 | O'Connor | |
| 2011/0094147 A1 | 4/2011 | Bartek et al. | |

(Continued)

FOREIGN PATENT DOCUMENTS

| | | |
|---|---|---|
| EP | 2361961 A2 | 8/2011 |
| WO | WO 2008/020048 | 2/2008 |

(Continued)

OTHER PUBLICATIONS

Bridgwater, Fast Pyrolysis Processes for Biomass, Renewable & Sustainable Energy Reviews, 2000, pp. 1-73, 4, Pergamon.

*Primary Examiner* — Ellen McAvoy
*Assistant Examiner* — Chantel Graham
(74) *Attorney, Agent, or Firm* — John Wilson Jones; Jones & Smith, LLP (57) ABSTRACT

A process for preparing a renewable biofuel consists of subjecting a bio-oil mixture to deoxygenation in a hydrotreater and then separating hydrocarbon fractions from the deoxygenated product to form the biofuel. The bio-oil mixture contains a bio-oil feedstream and a treated bio-oil feed. The treated bio-oil feed is a stream from which undesirable heavy materials and solid materials have been removed.

43 Claims, 7 Drawing Sheets

(56) References Cited

U.S. PATENT DOCUMENTS

| | | |
|---|---|---|
| 2011/0099888 A1 * | 5/2011 | Bartek .................. C10G 11/18 44/307 |
| 2011/0114876 A1 | 5/2011 | Brady et al. |
| 2011/0138681 A1 | 6/2011 | Ramirez Corredores et al. |
| 2011/0154720 A1 | 6/2011 | Bartek et al. |
| 2011/0258913 A1 | 10/2011 | Stamires et al. |
| 2011/0283601 A1 | 11/2011 | Ditsch |
| 2012/0017492 A1 | 1/2012 | Ramirez Corredores et al. |
| 2012/0047794 A1 | 3/2012 | Bartek et al. |
| 2012/0067773 A1 | 3/2012 | Ditsch |
| 2012/0101318 A1 | 4/2012 | Corredores et al. |
| 2012/0172643 A1 | 7/2012 | Ramirez Corredores et al. |

FOREIGN PATENT DOCUMENTS

| | | |
|---|---|---|
| WO | WO 2009/082366 | 7/2009 |
| WO | WO 2009/126508 | 10/2009 |
| WO | WO 2010/002792 | 1/2010 |
| WO | WO 2010/033789 | 3/2010 |
| WO | 2010039693 A2 | 4/2010 |
| WO | WO 2011/064172 | 6/2011 |
| WO | WO 2012/012091 | 1/2012 |
| WO | WO 2012/027428 | 3/2012 |

* cited by examiner

PROCESS FOR PRODUCING RENEWABLE BIOFUEL FROM A PYROLYZED BIOMASS CONTAINING BIO-OIL STREAM

FIELD OF THE INVENTION

The invention relates to a method of producing a renewable biofuel from a bio-oil stream and a hydrotreated bio-oil derived feedstream.

BACKGROUND OF THE INVENTION

Renewable energy sources are a substitute for fossil fuels and provide a means of reducing dependence on petroleum oil. Biomass is conventionally used as a feedstock to produce renewable energy sources, such as biofuels.

Catalytic thermolysis processes such as pyrolysis have been developed that use biomass as a feedstock to produce useful biofuels. Such processes produce liquid products that spontaneously separate into an aqueous phase and an organic phase. The organic phase is commonly referred to as bio-oil. While thermolysis processes produce high yields of bio-oil, most, if not all, of the bio-oil produced is of low quality due to the high amount of oxygen present in the bio-oil.

Bio-oil can be stabilized and converted to a conventional hydrocarbon fluid by removing the oxygen through hydrotreating. This process involves contacting the bio-oil with hydrogen under pressure and at moderate temperatures, generally less than 750° F., over fixed bed reactors. Hydrotreating the bio-oil makes it compatible with petroleum derived refinery streams.

However, when bio-oil containing streams are hydrotreated, heavy components in the bio-oil can render coke forming heavy materials and solids which can plug the catalytic hydrotreating bed and reduce on-stream time.

A system is therefore needed that can remove such undesirable components from the bio-oil in order to improve the hydrotreating process and render quality products.

SUMMARY OF THE INVENTION

The invention is drawn to a process for producing renewable biofuels from a bio-oil mixture containing a bio-oil feedstream and a treated bio-oil feed. The treated bio-oil feed is obtained by separating undesirable heavy materials and solids—such as phenolic oligomers, aldol condensation products, and olefins and derivatives, polar nitrogen compounds, char and inorganic solids in the pyrolysis oil—from bio-oil. After removal of water and the heavy materials and solids, the separated stream is subjected to deoxygenation in a hydrotreater. The undesirable heavy materials and solids which are removed are capable of plugging the catalytic hydrotreating bed. A portion of the hydrotreated product is then recycled and mixed with the bio-oil feedstream to continue the cycle. The process is typically conducted at a temperature of 68° F. or greater.

In an embodiment, a renewable biofuel may be generated from bio-oil by first mixing a bio-oil feedstream with a hydrotreated stream to render a bio-oil mixture. The bio-oil mixture is deoxygenated in a hydrotreater having a catalytic hydrotreating bed. One or more light hydrocarbon streams having a boiling point less than about 650° F. and hydrocarbons having a boiling point in excess of about 650° F. are separated from the deoxygenated stream. A portion of one or more of the hydrocarbon light streams having a boiling point less than about 650° F. may be recycled and mixed with the bio-oil feedstream. The renewable biofuel is generated from at least one of the separated hydrocarbon streams. The process may be continuous wherein a portion of a one or more of the light hydrocarbon streams serves as the hydrotreated stream admixed with the bio-oil feedstream. During the continuous process, materials capable of plugging the catalytic hydrotreating bed are removed from the bio-oil mixture prior to feeding the bio-oil mixture into the hydrotreater.

In an embodiment, two or more hydrocarbon fractions having a boiling point less than 650° F. may be separated from the deoxygenated stream in one or more fractionators. These fractions may be a naphtha stream having a boiling point generally between from about 150° F. to about 350° F. and a hydrocarbon distillate having a boiling point between from about 320° F. to about 650° F. A portion of one or more of these streams may be recycled and admixed with the bio-oil feedstream to form the bio-oil mixture.

In another embodiment, a partially hydrotreated or intermediate product may be removed from the hydrotreater and recycled back as the hydrotreated stream and admixed with the bio-oil feedstream to form the bio-oil mixture. In this embodiment, renewable biofuels may be produced from a bio-oil feedstream by first mixing at least a partially deoxygenated hydrotreated bio-oil stream with a bio-oil feedstream to form a bio-oil mixture and then removing at least a portion of the heavy materials and solids from the bio-oil mixture to render a separated bio-oil mixture. The separated bio-oil mixture may then be at least partially deoxygenated in a hydrotreater having a catalytic hydrotreating bed. The deoxygenated product may then be separated into the hydrocarbon streams from which biofuel may be generated.

In another embodiment, a renewable biofuel may be generated from bio-oil by first mixing a bio-oil feedstream with a hydrotreated stream to render a bio-oil mixture. The bio-oil mixture may then be deoxygenated in a hydrotreater having a catalytic hydrotreating bed. One or more light hydrocarbon streams having a boiling point less than about 650° F. and hydrocarbons having a boiling point in excess of about 650° F. are separated from the deoxygenated stream by fractionation. The renewable biofuel is generated from at least one of the separated hydrocarbon streams. Prior to fractionation, a portion of the hydrotreated stream may be recycled and mixed with the bio-oil feedstream as the treated bio-oil feed. The process may be continuous wherein a portion of the treated bio-oil feed is admixed with the bio-oil feedstream. During the continuous process, materials capable of plugging the catalytic hydrotreating bed are removed from the bio-oil mixture prior to feeding the bio-oil mixture into the hydrotreater.

In another embodiment, the bio-oil stream may contain bio-naphtha. The bio-naphtha may be added from an external source to the bio-oil feedstream. Alternatively, the bio-naphtha may be generated during the process. For instance, prior to subjecting the mixture to the hydrotreater and after the removal of the heavy components from the mixture, the stream may be fractionated to obtain bio-naphtha. The bio-naphtha generated from the fractionator may then be introduced into the mixing zone containing the bio-oil feedstream.

In still another embodiment, the treated bio-oil feed which is mixed with the bio-oil feedstream may be one or more streams selected from the separated pre-fractionated hydrotreated product, a portion of one or more of the hydrocarbon-separated from the hydrotreater having a boiling point less than 650° F. or a partial deoxygenated intermediate. Further, the bio-oil feedstream may contain bio-naphtha.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Renewable biofuels may be prepared from a bio-oil mixture containing a bio-oil feedstream and a treated bio-oil feed. The bio-oil mixture is subjected to deoxygenation in a hydrotreater to render an acceptable treated bio-oil feed. Prior to being subjected to deoxygenation, undesirable heavy materials and solid materials are removed from the bio-oil mixture. The deoxygenated stream is then subjected to fractionation. The renewable biofuel is a product of one or more of the streams resulting from fractionation or a portion of the deoxygenated stream prior to fractionation. A portion of the product which results from deoxygenation may be recycled to act as the treated bio-oil feed. Thus, the process may be continuous, the treated bio-oil feed being a stream from which heavy materials and solid materials have been removed.

The process described herein effectively assists in phase separation for the removal of residual solids, water byproduct and polar heavy materials from bio-oil which are detrimental to catalytic hydrotreating beds. In addition, the process provides for better performance within the hydrotreater and provides a means for attaining longer service of the hydrotreater at a lower cost.

The bio-oil feedstream may be the resultant of thermal pyrolysis, catalytic gasification or hydrothermal pyrolysis or another biomass conversion process. The bio-oil feedstream may be purified, partially purified or non-purified bio-oil. The bio-oil feedstream may also contain bio-naphtha. In addition, it may contain hydrotreated oil not subjected to the removal of heavy materials and solids as described herein.

The bio-oil feedstream may have been produced within the same plant or facility in which the renewable biofuel is prepared or may be produced in a remote location. As such, the process described herein may be a portion of a more comprehensive engineering design. Alternatively, the process may be confined to the production of a renewable biofuel from a bio-oil mixture as defined herein.

FIGS. 1, 2, 3, 4 and 5 are flow diagrams illustrating alternative embodiments for the production of a renewable biofuel in accordance with the process defined herein. In each of the figures, the bio-oil feedstream 10, after being separated from the gas fraction, is shown as being mixed with a treated bio-oil feed in mixing zone 15. In the mixing zone the bio-oil feedstream is mixed with a portion of the treated bio-oil feed as described herein to form the bio-oil mixture. Typically, the bio-oil feedstream and the treated bio-oil feed are vigorously mixed at temperatures, generally in the range between 86° F. and 302° F., in mixing zone 15. These higher temperatures improve efficiencies of mixing, extraction, phase separation and handling. The mixing zone may be an in-line mixer or a conventional mixer.

The mixture of treated bio-oil feed and the bio-oil feedstream is then introduced into separator 20. When the process commences, the bio-oil is fed directly into the separator since there is no treated bio-oil feed to mix with the bio-oil. The phase separation at the start of the process can be facilitated by the use of a surrogate light solvent which is preferably derived from a biomass source, but which can be from a fossil source if there is not suitable biomass derived material available. Such solvents include, for example, ethers, ethanol, furfural, furfuryl alcohol, levulinic acid, ethyl levulinate and butyl levulinate. The high molecular components that tend to form solids are separated in separator or settler 20. Separator 20 may be any conventional separation unit which allows water and solid materials, such as tar, to be separated from the bio-oil mixture. For instance, the separator may be a coalescer, gravity phase separator, liquid hydrocyclone, electrostatic desalter, etc. Typically, from about 90 to 95 percent of the solids are removed from the mixture in the separator. Optionally and preferably, remaining solids in the mixture may further be removed, such as by polishing filtration.

Heavy and solid materials in bio-oil feedstreams are highly detrimental to hydrotreating operations because they are known to plug the catalytic hydrotreating bed. Typically, the heavy materials may be fine inorganic oxides and clays, catalyst fines, salts of phenolic and organic acids, polar nitrogen compounds, char, as well as phenolic oligomers, aldol condensation products as well as materials derived from olefins in the pyrolysis oil. Such materials are very detrimental to the hydrotreating of bio-oil since the deposits form solids and cokes which plug hydrocatalytic reactors. The separation and removal of solids and heavy materials from a hydrotreated feed of bio-oil renders a green fuel of high purity from renewable sources and facilitates hydrotreating.

In addition to the removal of heavy materials and solids, water may be removed during the separation. There must a density difference between the water and oil in order for the water and oil to separate in the separator.

The bio-oil mixture, having the byproduct water, heavy materials and solids removed, is then introduced into hydrotreater 35 where the bio-oil mixture is subjected to deoxygenation by the introduction of hydrogen into the hydrotreater. Typically from 90 to about 99.99% of the oxygen is removed from the separated mixture in the hydrotreater. Typically, the oxygen complexes with the hydrogen to form water. Other by-products, such as hydrogen sulfide, are also formed in the hydrotreatment operation.

Figure 5:
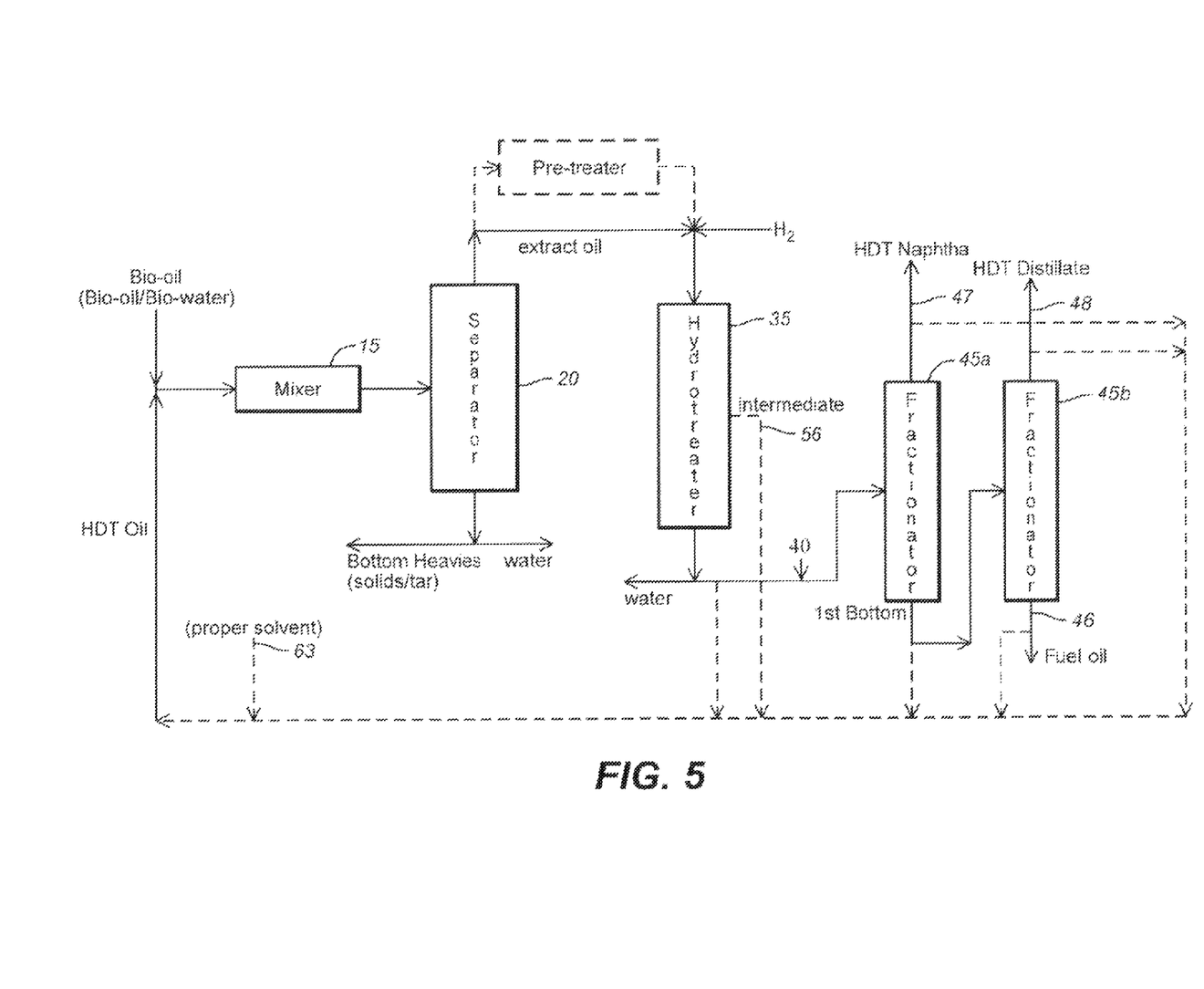
FIG. 5 represents a process of the invention which illustrates the various fractions which may be used as the treated bio-oil feed for admixing with the bio-oil feedstream.

As illustrated in FIG. 5, prior to the completion of deoxygenation, a partially deoxygenated intermediate stream 56 may be removed from hydrotreater 35. This partial deoxygenated intermediate may be recycled as the treated bio-oil feed and mixed with the bio-oil feedstream in the mixing zone.

The remaining product, referred to as the Total Liquid Hydrotreated Product, TLHP, 40 is then separated in fractionator 45 into two or more products. Prior to fractionation, the separated hydrotreated material may first be introduced into a second separator 42 to separate water and/or oil from the stream which has been produced during deoxygenation. A gas fraction typically comprised of methane, hydrogen and hydrogen sulfide is also removed in separator 42. The produced water is typically recycled to the front end of the process and may be, for instance, used in the bioconverter unit. The gas fraction typically proceeds to the waste oil boiler. As shown in FIG. 5, the separated oil may be introduced into the mixing zone as the treated bio-oil feed to form the bio-oil mixture with the bio-oil feedstream.

Renewable biofuels may be generated from the streams separated in fractionator 45. Such fuels may be used, for instance, as transportation fuels, such as gasoline and aviation fuels, as well as diesel fuels or similar products.

As illustrated in FIGS. 1-5, one of these streams is a heavy fraction 46 containing hydrotreated materials having a boiling point in excess of 650° F. This heavy fraction may be used as a bio-fuel or further extracted with hydrotreated oil, recycled for cracking or stripped for greater oil recovery, etc.

The other fraction contains lighter distillates having a boiling point less than 650° F. This lighter fraction may be distilled as a single fraction or a multiple of lighter fractions. As shown in FIGS. 1-4, these two fractions may be hydrotreated naphtha 47 having a boiling point between from about 150° F. to about 350° F. and a hydrocarbon distillate 48 having a boiling point between from about 320° F. to about 650° F. FIG. 5 shows such multiple fractions may be obtained by using more than one fractionator, 45a and 45b.

The process may be continuous. Thus, prior to hydrotreating the bio-oil mixture the bio-oil feedstream is first mixed with a stream which has previously been hydrotreated. This dilutes the concentration of heavy materials and solid materials and decreases the viscosity of the bio-oil feedstream and thus assists phase separation of water, the heavy materials and solids. Dilution of the bio-oil feedstream with the treated bio-oil feed may further substantially minimize the formation of heavy materials and cokes from condensation reactions of some of the remaining reactive chemicals in the bio-oil feedstream subjected to storage. The use of a non-polar treated bio-oil feed decreases the polarity of the bio-oil feedstream such that the heavy materials and solids more easily settle out of the bio-oil feed.

Figure 1:
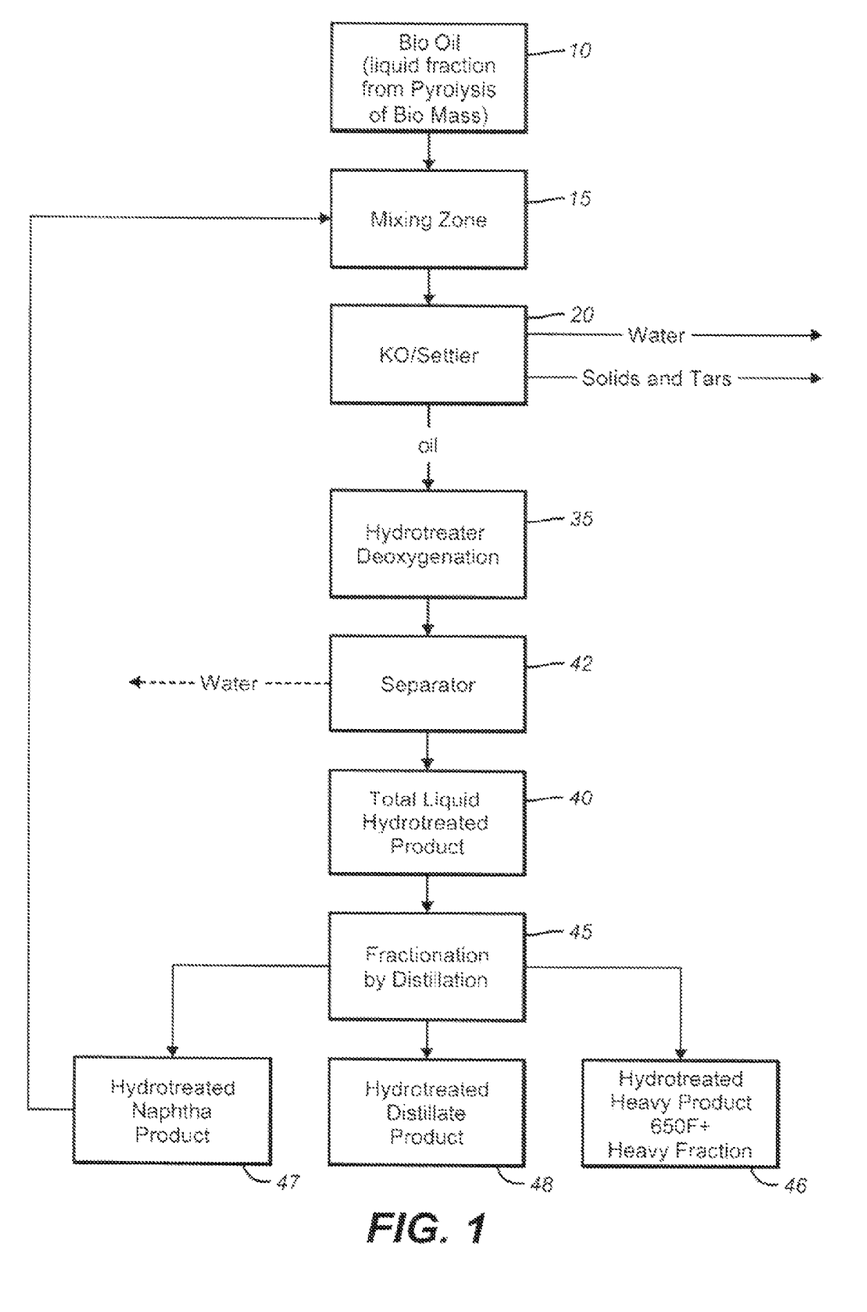
FIG. 1 represents a process of the invention wherein a portion of a hydrotreated naphtha stream is used as a hydrotreated bio-oil feed for admixing with a bio-oil feedstream.
Figure 2:
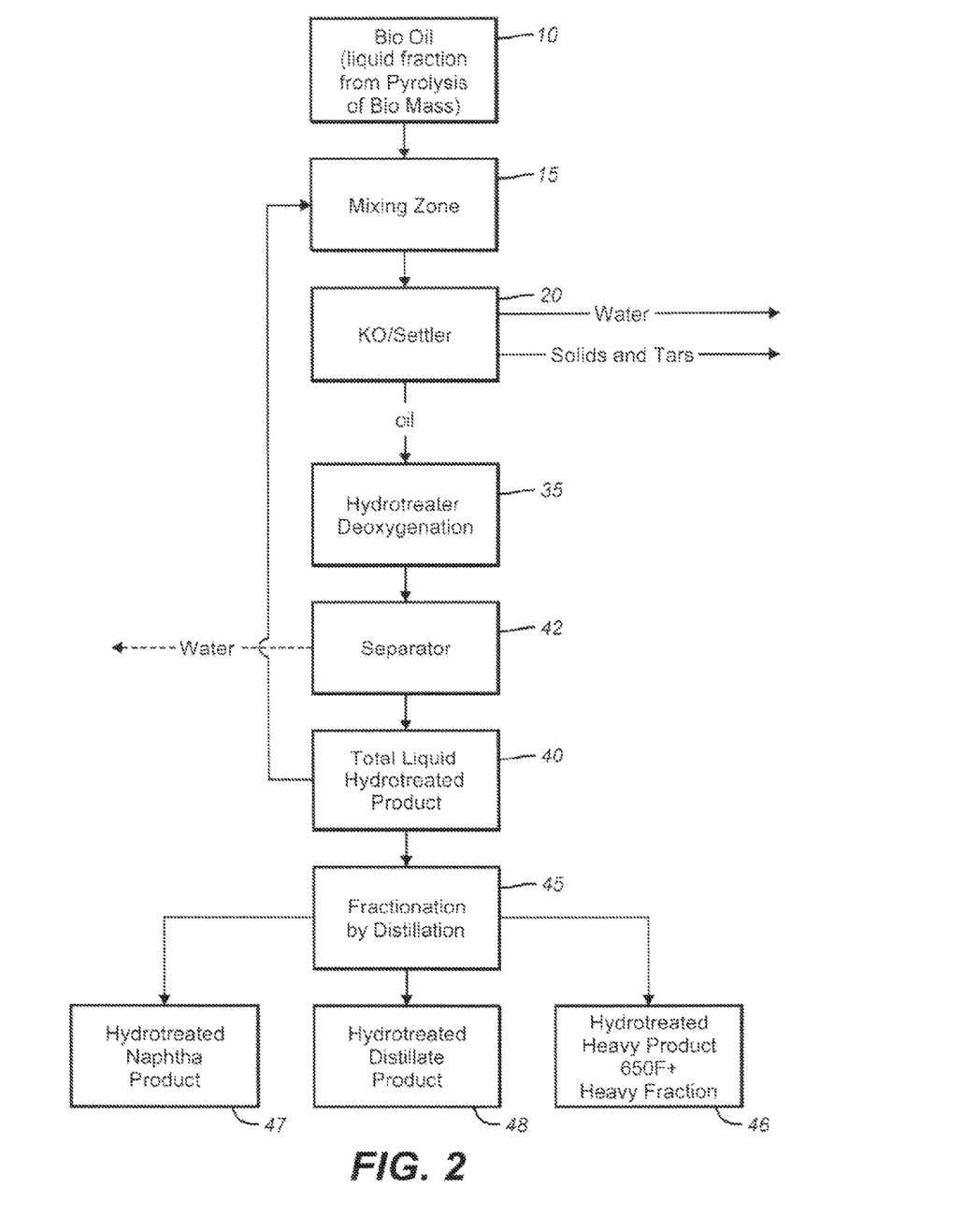
FIG. 2 represents a process of the invention wherein a bio-oil feedstream is admixed with a portion of a hydrotreated product prior to fractionation of the hydrotreated product.
Figure 3:
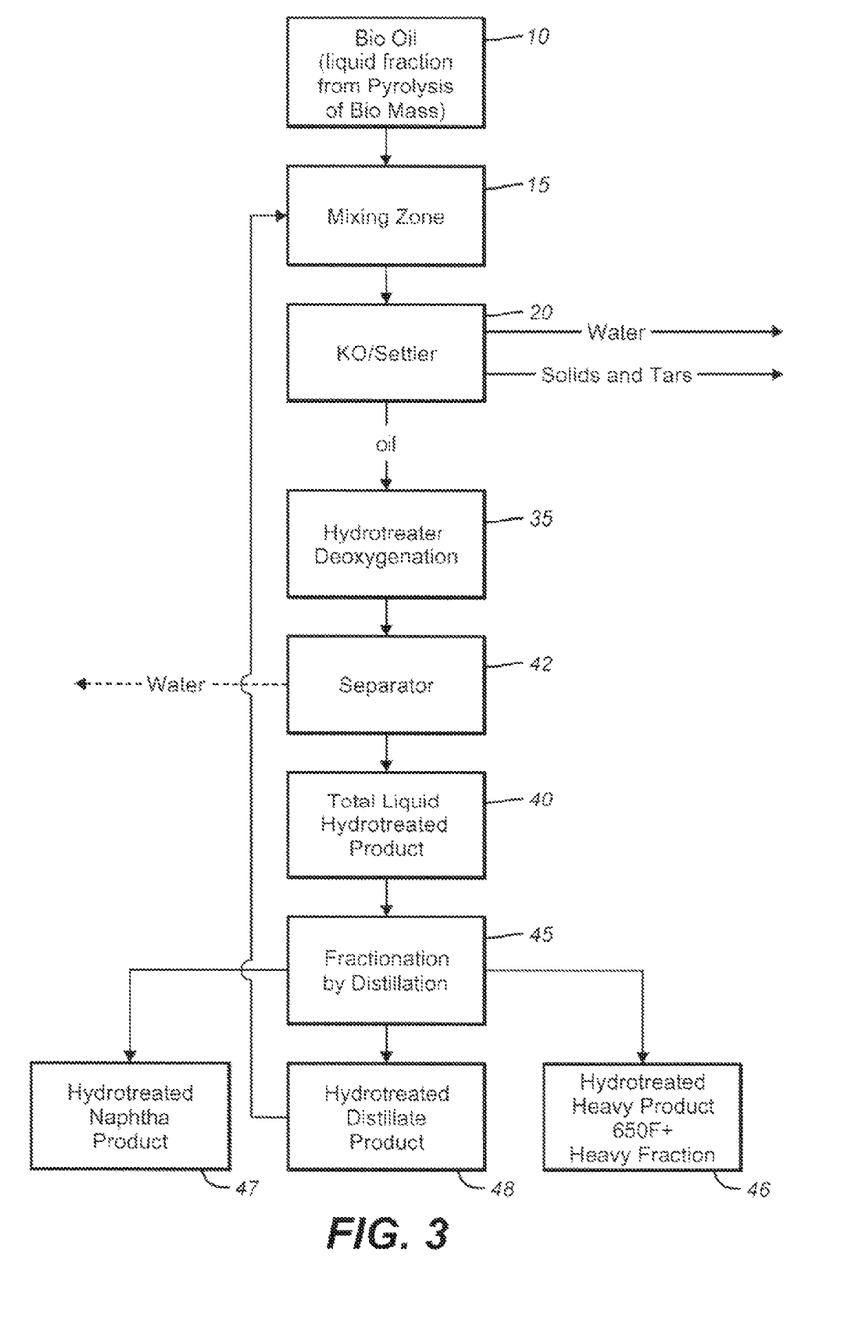
FIG. 3 represents a process of the invention wherein a portion of a hydrocarbon distillate stream having a boiling point between from about 320° F. and 650° F. is used as the hydrotreated bio-oil feed for admixing with a bio-oil feedstream.

The treated bio-oil feed mixed with the bio-oil feedstream is preferably either hydrotreated naphtha and/or hydrotreated hydrocarbon distillate. FIG. I illustrates recycling a portion of the hydrotreated naphtha to the mixing zone as the treated bio-oil feed to form the bio-oil mixture with the bio-oil feedstream. The remaining portion of the hydrotreated naphtha may be isolated as a renewable bio-fuel. FIG. 3 illustrates an alternative process wherein a portion of the hydrotreated hydrocarbon distillate is recycled to the mixing zone as the treated bio-oil feed to form the bio-oil mixture with the bio-oil feedstream. The remaining portion of the hydrotreated hydrocarbon distillate may be isolated as a renewable bio-fuel. For bio-oil feedstreams containing a high concentration of undesirable components, the addition of hydrotreated naphtha most effectively assists in the separation and removal of the heavy components. FIG. 2 represents an alternative design to the process wherein a portion of the hydrotreated distillate is recycled back to the mixing zone.

The process may be continuous. Thus, prior to being hydrotreated, the bio-oil feedstream is mixed with a treated bio-oil feed (a previously hydrotreated stream). The resulting bio-oil mixture contains residues in which solid material and heavy materials have been diluted.

Thus, as shown in FIG. 1, the process defined herein advances all of the hydrocarbons from the hydrotreater to the fractionators except for a portion of the hydrotreated naphtha product which is recycled back into the mixing zone.

FIG. 3 shows another alternative design to the process wherein a portion of the TLHP may be recycled back to the mixer. Since the TLHP is more polar than the hydrotreated naphtha product or the hydrotreated hydrocarbon distillate, it exhibits different solvent properties than hydrotreated naphtha. Being more polar than hydrotreated naphtha or the hydrotreated hydrocarbon distillate, combining the TLHP with the bio-oil feed causes heavy materials within the bio-oil to be less efficiently separated in separator 20.

Figure 4:
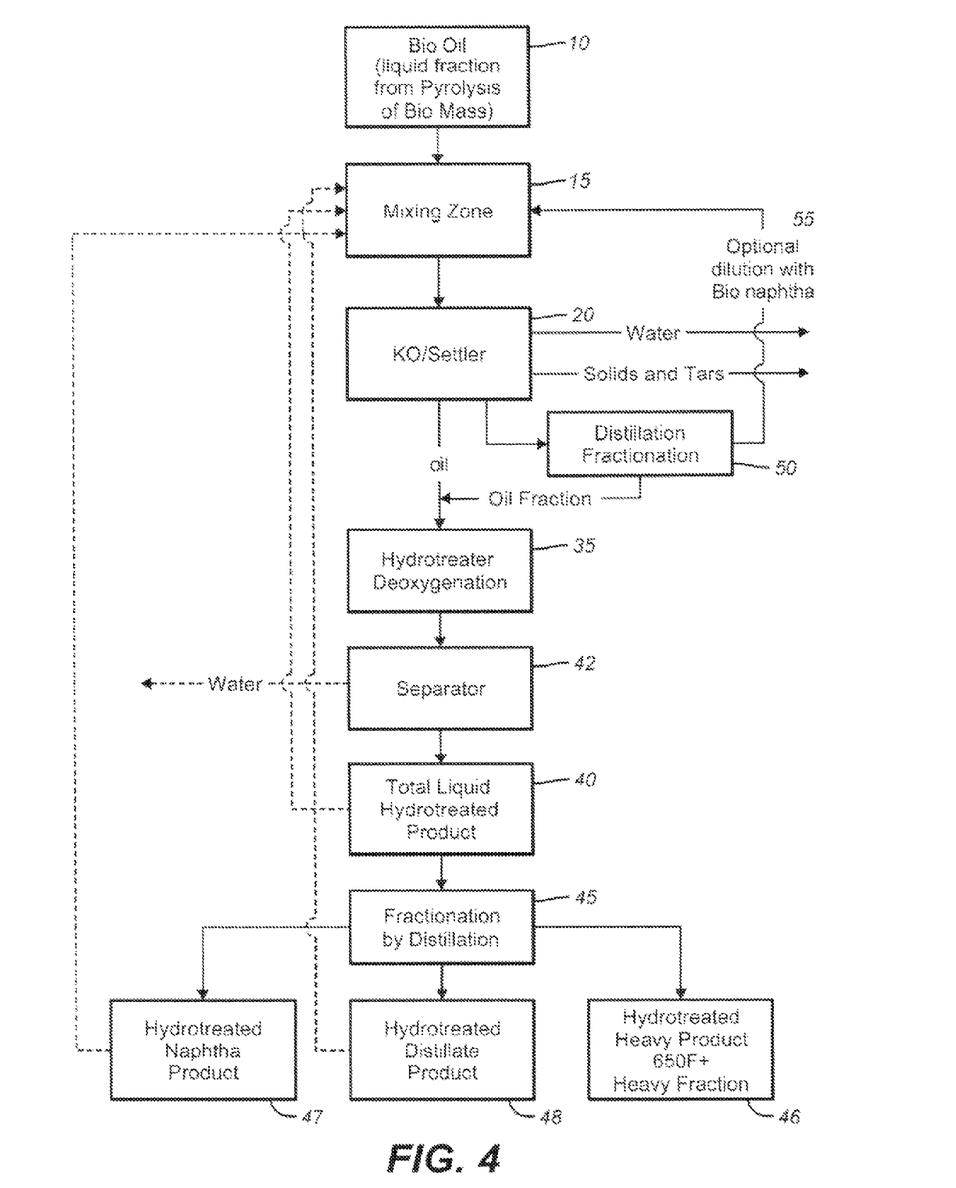
FIG. 4 represents a process of the invention wherein a bio-oil mixture is diluted with bio-naphtha obtained by distilling a bio-oil mixture subsequent to removal of heavy materials and solids from the bio-oil mixture.

FIG. 4 presents another embodiment of the invention wherein at least a portion of the separated bio-oil mixture (the bio-oil mixture having been treated to remove heavy materials and solids) is fed to fractionator 50 to separate bio-naphtha. The bio-naphtha 55 may then be introduced into mixing zone 15 to dilute the bio-oil feedstream. The heavier portion of the separated bio-oil mixture (generally having a boiling point in excess of 320° F.) is introduced into hydrotreater 35. Dilution of the bio-oil feedstream provides for the use of a less volatile treated bio-oil feed.

As illustrated in each of the figures, the entire process described herein may be continuous such that one or more streams is used as the treated bio-oil feed for admixing with the bio-oil feedstream to render the bio-oil mixture. While FIGS. 1, 2 and 3 (for ease of understanding) demonstrate a portion of either the hydrotreated naphtha, the TLHP, the hydrotreated distillate, or the partial deoxygenated intermediate, respectively, as the stream being recycled, it is understood that any combination of these streams may be used. In FIG. 4, the optional distillation of the bio-oil mixture to render bio-naphtha as diluent is illustrated as using these streams (individually or in combination) to form the bio-oil mixture. A combination of more than one stream being used as the bio-oil hydrotreated stream is shown in FIG. 5.

Further, FIG. 5 demonstrates that the treated bio-oil feed may further be the TLHP separated from the hydrotreater (prior to fractionation) as well as the bottom fractions separated from any of the one or more fractionators. In addition, FIG. 5 demonstrates that the naphtha stream may be an external source 63 (versus being generated in-situ). Further, FIG. 5 demonstrates that any of the streams may further be diluted in-line with a solvent. The pre-treater referenced in FIG. 5 may be a polishing filter, settling storage tank as well as the fractionator for bio-naphtha recovery.

The following examples are illustrative of some Of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

Examples 1-4

Into a container was mixed bio-oil, hydrotreated oil and processed water. The contents of the bio-oil are set forth in Table I:

TABLE 1

| | |
|---|---|
| Residual solids (ppm) | 1331 |
| Oxygen (wt %) | 10.96 |
| Carbon (wt %) | 78.58 |
| Hydrogen (wt %) | 7.66 |
| Nitrogen (wt %) | 0.23 |

TABLE 1-continued

| | |
|---|---|
| Residual water (wt %) | 3.29 |
| Density (g/cc @ 60° F. | 1.057 |

The container was then centrifuged for 5 minutes and the amount of each of the top phase, water phase and bottom phase was determined, wherein the top phase represents the Bio-Oil mixture or lighter phase containing the TLHP. The container was then decanted and the amount of solids in the decanted (bottom) oil and the heavy phase and solids in weight percent were determined. The results are set forth in Table II below wherein TLHP refers to the total organic fraction with water removed.

TABLE II

| | Ex. 1 | Ex. 2 | Ex. 3 | Ex. 4 |
|---|---|---|---|---|
| Components | | | | |
| Bio-oil, cc | 10 | 15 | 20 | 25 |
| TLHP, cc | 20 | 15 | 10 | 5 |
| Processed water, cc | 10 | 10 | 10 | 10 |
| After Centrifugation | | | | |
| Top phase, cc | 26 (oil) | 27 (oil) | No visual phases | |
| Solids Content, ppm | 0 | 0 | | |
| Water phase, cc | 10 | 10 | (10) | 10 (top phase) |
| Bottom phase, cc | 4 | 3 | 30 (total) | 30 |
| After Decanted | | | | |
| Solids in decanted (bottom oil), ppm | | | 55.9 | 50 |
| Heavy phase: g/15 cc Bio-oil | 4.44 | 2.98 | 0.73 | 0.41 |
| Solids (wt %) | 0.25 | 0.31 | 1.18 | 1.67 |

Examples 5-9

The procedure of Examples 1-4 was repeated but using a bio-oil feedstream having a greater amount of oxygen as shown in Table III:

TABLE III

| | |
|---|---|
| Residual solids (ppm) | 5388 |
| Oxygen (wt %) | 14.7 |
| Carbon (wt %) | 76.03 |
| Hydrogen (wt %) | 7.31 |
| Nitrogen (wt %) | 0.05 |
| Residual water (wt %) | 3.56 |
| Density (g/cc @ 60° F. | 1.1068 |

Bio-naphtha was added to the bio-oil mixture of Examples 7-9. The feedstream is set forth in Table IV:

TABLE IV

| Components | Comp. Ex. 5 | Ex. 6 | Ex. 7 | Ex. 8 | Ex. 9 |
|---|---|---|---|---|---|
| Bio-oil, cc | 35 | 15 | 15 | 15 | 15 |
| Bio-naphtha, cc | — | — | 5 | 10 | 15 |
| TLHP, cc | — | 15 | 10 | 5 | — |
| Processed water, cc | — | 5 | 5 | 5 | 5 |
| After Centrifugation | | | | | |
| Top phase, cc | — | 20 (oil) | 25 (oil) | 34 (oil) | 34 (oil) |
| Solids Content, ppm | — | 0 | 3.3 | 7.7 | 55.1 |
| Water phase, cc | — | 5 | 5 | 5 | 5 |
| Bottom phase, cc | 35 (oil) | 10 | 5 | ~1 | ~1 |

The ppm in the (top) oil phase in Examples 5 and 6 was determined to be:

| | Al | Ca | Fe | P | Si |
|---|---|---|---|---|---|
| Ex. 5 | 149.9 | 59.8 | 29.36 | 25.69 | 76.5 |
| Ex. 6 | 14.52 | 0.666 | 8.99 | 0.204 | 1.297 |

After Decanted

| | Comp. Ex. 5 | Ex. 6 | Ex. 7 | Ex. 8 | Ex. 9 |
|---|---|---|---|---|---|
| Solids in decanted (bottom oil), ppm | 169.1 | 28.7 | — | — | — |
| Heavy phase: g/15 cc Bio-oil | 0.65 | 1.29 | 5.24 | 0.93 | 0.97 |
| Solids (wt %) | 9.09 | 7.25 | 3.18 | 17.27 | 16.26 |

The low percent solids in the oil phase in Examples 1-9 demonstrate that the bio-oil mixture fed into the hydrotreater has very low solids content. No phase separation was seen in Comp. Ex. 5. The preferred results are demonstrated in Example 7 and 8 where the volumetric ratio of bio-naphtha: TLHP for the bio-oil feedstream is 1:2 to 2:1.

Examples 10-12

The procedure of Examples 1-4 was repeated, using the bio-oil feedstream of Table I containing about 1330 ppm solids and using (in place of TLHP) a naphtha stream fractionated from the TLHP. The results are set forth in Table V where the centrifuged oil refers to the top phase.

TABLE V

| Example | HDT-Naphtha/ Bio-oil (cc/cc) | solids in centrifuged oil (ppm) | heavies phase (g/15 cc of Bio-oil used) |
|---|---|---|---|
| 10 | 0.75 | 6 | 1.20 |
| 11 | 0.5 | 7.4 | 0.17 |
| 12 | 0.2 | 35.9 | 0.19 |

Examples 13-15

The procedure of Examples 1-4 was repeated, using the bio-oil feedstream of Table I containing about 1330 ppm solids and using (in place of TLHP) a distillate stream fractionated from the TLHP. The results are set forth in Table VI.

TABLE VI

| Example | HDT-Distillate/ Bio-oil (cc/cc) | solids in centrifuged oil (ppm) | heavies phase (g/15 cc of Bio-oil used) |
|---|---|---|---|
| 13 | 0.75 | 6.6 | 1.41 |
| 14 | 0.5 | 9.1 | 0.21 |
| 15 | 0.2 | 22.5 | 0.18 |

Figure 6:
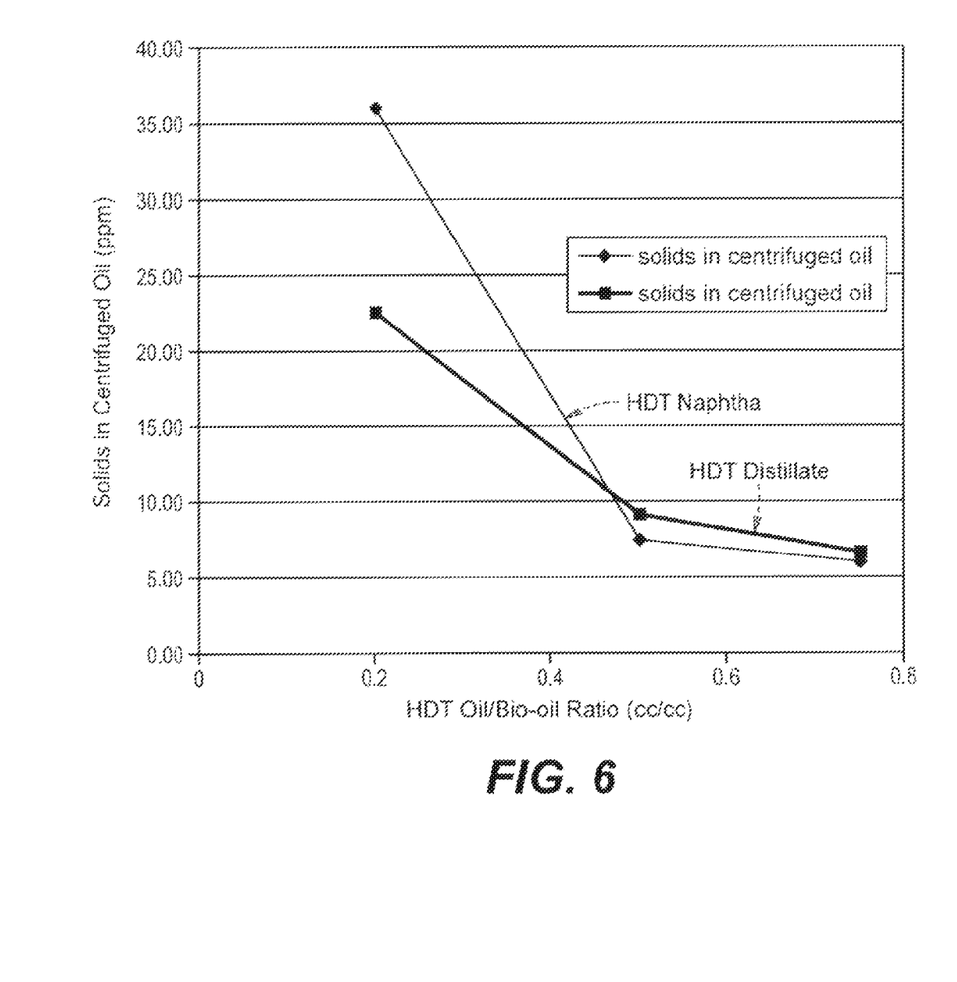
FIG. 6 and FIG. 7 represent an optimal ratio of hydrotreated naphtha or distillate to the bio-oil in a bio-oil feedstream to be approximately 0.6 to 0.7 v/v.
Figure 7:
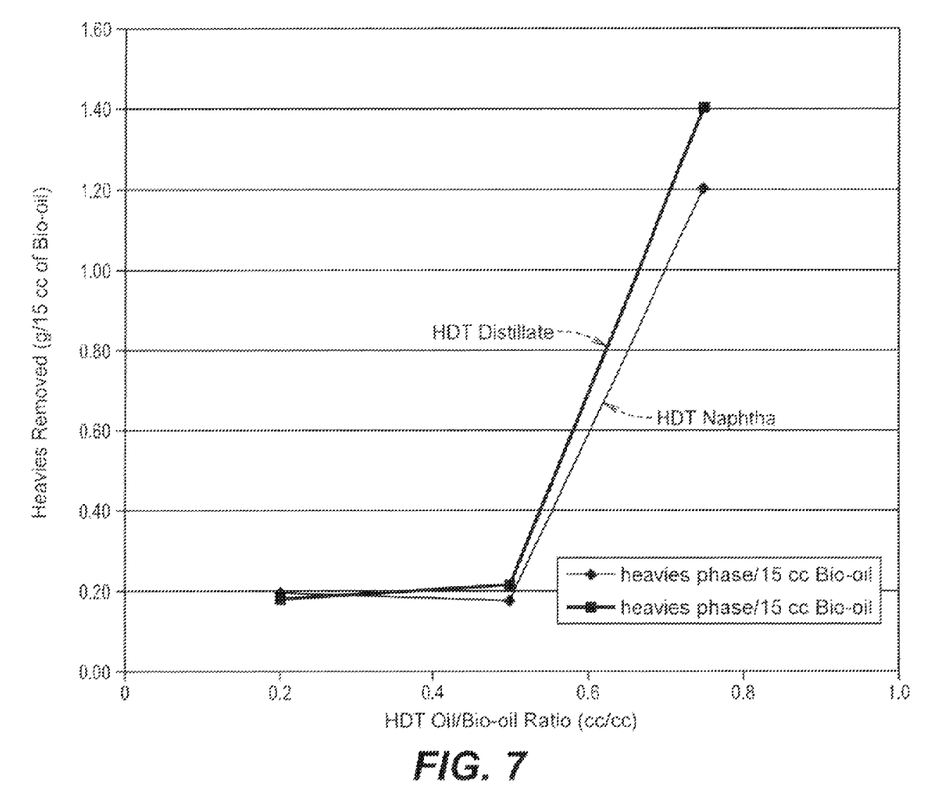

The reading for the heavies phase represents the amount of material loss and yield loss since the heavy phase further contains desired oil. Tables V and VI illustrate that preferred results for the designed bio-oil feedstream is obtained when the volume ratio of the Naphtha or the Distillate and the bio-oil was between about 0.5 and about 0.75 where most of the solids are decreased and a portion of the heavies phase is decreased. FIG. 6 and FIG. 7 (graphically demonstrating the data from Table VI) represent the optimal range of the ratio for the bio-oil feedstream to be approximately 0.6-0.7, depending on chemical and physical properties of the bio-oil feedstream.

Examples 16-18

The procedure of Examples 1-4 was repeated, using a bio-oil feedstream containing about 15.27% oxygen and 10440 ppm solids and using (in place of TLHP) a distillate stream fractionated from the TLHP with the addition of bio-naphtha. The results are set forth in Table VII where the centrifuged oil refers to the top phase.

TABLE VII

| Example | HDT-Distillate/ Bio-Naphtha/Bio-oil (cc/cc/cc) | solids in centrifuged oil (ppm) | heavies phase (g/15 cc of Bio-oil |
|---|---|---|---|
| 16 | 0/1/1 | 55.1 | 0.97 |
| 17 | 0.5//0.5/1 | 8.8 | 1.50 |
| 18 | 0.67/0.33/1 | 4.4 | 5.35 |

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A process for producing a renewable biofuel from a pyrolyzed biomass containing bio-oil stream and a treated bio-oil feed, the process comprising:
   (a) mixing in a mixing zone at least a portion of the treated bio-oil feed with the pyrolyzed biomass containing bio-oil stream to form a bio-oil mixture;
   (b) separating water and at least a portion of the heavy fraction from the bio-oil mixture produced in the mixing zone to render a non-heavy fraction of the bio-oil mixture;
   (c) subjecting the non-heavy fraction of the bio-oil mixture produced in the mixing zone to deoxygenation in a hydrotreater to form a separated hydrotreated product and, optionally, a partial deoxygenated intermediate and removing the separated hydrotreated product and the optional partial deoxygenated intermediate from the hydrotreater;
   (d) removing produced water from the separated hydrotreated product;
   (e) subjecting the separated hydrotreated product of step (c) to fractionation to render oil having a boiling point in excess of 650° F. and at least one hydrocarbon fraction having a boiling point less than 650° F. and;
   (f) generating renewable biofuel from the separated fractions
   wherein the treated bio-oil feed is at least one of the following:
   (i) at least a portion of the separated hydrotreated product; or
   (ii) at least a portion of the at least one hydrocarbon fraction having a boiling point less than 650° F.; or
   (iii) a partial deoxygenated intermediate.

2. The process of claim 1, wherein the at least one hydrocarbon fraction having a boiling point less than 650° F. comprises (i) naphtha having a boiling point between from 150° F. to 350° F. and (ii) a hydrotreated distillate having a boiling point between from 320° F. to less than 650° F.

3. The process of claim 2, wherein the treated bio-oil feed is at least a portion of the naphtha.

4. The process of claim 2, wherein the treated bio-oil feed is at least a portion of the hydrotreated distillate.

5. The process of claim 1, wherein the treated bio-oil feed is at least a portion of the separated hydrotreated product.

6. The process of claim 1, further comprising mixing the pyrolyzed biomass containing bio-oil stream with a hydrotreated bio-oil feed comprising at least one member selected from the group consisting of:
   (i) at least a portion of the separated hydrotreated product;
   (ii) at least a portion of the at least one hydrocarbon fraction having a boiling point less than 650° F.; and
   (iii) a partial deoxygenated intermediate to form a bio-oil mixture and then repeating steps (b), (c), (d) and (e).

7. The process of claim 6, wherein the process is continuous.

8. The process of claim 6, further comprising, prior to repetitive step (c), fractionating the non-heavy fraction of the bio-oil mixture to yield a bio-naphtha stream and then diluting the bio-oil mixture with the bio-naphtha stream.

9. The process of claim 6, wherein the at least one hydrocarbon fraction is a light hydrocarbon distillate having a boiling point between from 320° F. to less than 650° F.

10. The process of claim 6, wherein the at least one hydrocarbon fraction is hydrotreated naphtha having a boiling point between 150° F. and 350° F.

11. The process of claim 1, wherein the pyrolyzed biomass containing bio-oil stream is derived from thermal pyrolysis.

12. The process of claim 1, wherein the bio-oil mixture contains bio-naphtha.

13. The process of claim 1, further comprising, after separating the at least a portion of the heavy fraction from the bio-oil mixture, removing residual solids from the bio-oil mixture.

14. The method of claim 13, wherein the residual solids are removed by polishing filtration.

15. A process for producing a renewable biofuel from a pyrolyzed biomass containing bio-oil stream and a hydrotreated bio-oil feed, the process comprising:
   (a) mixing in a mixing zone at least a portion of the hydrotreated bio-oil feed with the pyrolyzed biomass containing bio-oil stream to form a bio-oil wherein the pyrolyzed biomass containing bio-oil stream contains coke-forming heavy materials;
   (b) separating water and the coke-forming heavy materials from the bio-oil mixture produced in the mixing zone to form a separated bio-oil mixture;
   (c) subjecting the separated bio-oil mixture to deoxygenation in a hydrotreater to render a separated hydrotreated product and, optionally, a partial deoxygenated intermediate;
   (d) removing the optionally rendered partial deoxygenated intermediate from the hydrotreater;
   (e) removing produced water from the separated hydrotreated product of step (c) to render a treated separated hydrotreated product;

(f) subjecting the treated separated hydrotreated product to fractionation and obtaining hydrocarbon distillate fractions from the treated separated hydrotreated product; and (g) generating renewable biofuel from at least one of the hydrocarbon distillate fractions wherein at least a portion of the hydrotreated bio-oil feed is selected from a member of the group consisting of:
(i) the treated separated hydrotreated product;
(ii) one or more of the hydrocarbon distillate fractions from the treated separated hydrotreated product; and
(iii) the partial deoxygenated intermediate.

16. The process of claim 15, wherein the hydrotreated bio-oil feed comprises the hydrocarbon distillate fraction containing naphtha.

17. The process of claim 15, wherein at least a portion of the hydrotreated bio-oil feed is the treated separated hydrotreated product.

18. The process of claim 15, wherein the pyrolyzed biomass containing bio-oil stream is derived from thermal pyrolysis.

19. The process of claim 15, further comprising, prior to step (c), fractionating the separated bio-oil mixture to obtain a bio-naphtha stream and then diluting the bio-oil mixture with the fractionated bio-naphtha stream.

20. A process for producing a renewable biofuel from a pyrolyzed biomass containing bio-oil stream comprising:
(a) mixing the pyrolyzed biomass containing bio-oil stream with a hydrotreated stream to render a bio-oil mixture;
(b) deoxygenating the bio-oil mixture in a hydrotreater having a catalytic hydrotreating bed;
(c) separating two or more hydrocarbon streams from the deoxygenated stream; and
(d) generating the renewable biofuel from at least one of the separated hydrocarbon streams of step (c)
wherein, prior to step (b), materials capable of plugging the catalytic hydrotreating bed are removed from the bio-oil mixture wherein said materials comprise inorganic oxides, clays, catalyst fines, salts of phenolic or organic acids, polar nitrogen compounds, char, phenolic oligomers, aldol condensation products, olefin-derived materials or a mixture thereof.

21. The process of claim 20, wherein:
(i) at least a portion of one of the separated hydrocarbon streams of step (c) is mixed with a bio-oil stream to form a bio-oil mixture; and
(ii) repeating steps (b), (c) and (d)
and further wherein, prior to each repetition of step (b), the materials capable of plugging the catalytic hydrotreating bed are removed from the bio-oil mixture.

22. The process of claim 21, wherein the process is a continuous process.

23. The process of claim 20, wherein the pyrolyzed biomass containing bio-oil stream contains bio-naphtha.

24. The process of claim 20, wherein at least one of the separated hydrocarbon streams contains naphtha.

25. The process of claim 20, wherein, prior to step (c), a portion of the deoxygenated mixture is mixed with the pyrolyzed biomass containing bio-oil stream as the hydrotreated product.

26. A process for producing renewable biofuel from bio-oil comprising:
(a) subjecting biomass to pyrolysis in a biomass conversion unit to render a pyrolyzed biomass containing bio-oil stream and then mixing at least a partially deoxygenated hydrotreated bio-oil stream with the pyrolyzed biomass containing bio-oil stream in an in-line mixer to form a bio-oil mixture;
(b) removing at least a portion of materials having a boiling point in excess of 650° F. from the bio-oil mixture to render a separated bio-oil mixture;
(c) at least partially deoxygenating the separated bio-oil mixture of step (b) in a hydrotreater having a catalytic hydrotreating bed;
(d) separating the product of step (c) into one or more light hydrocarbon fractions; and
(e) generating biofuel from one or more of the one or more light hydrocarbon fractions of step (d).

27. The process of claim 26, wherein the one or more light hydrocarbon fractions of step (d) are mixed with a pyrolyzed biomass bio-oil containing stream to form a bio-oil mixture and further wherein steps (b), (c) and (d) are repeated.

28. The process of claim 27, wherein the process is continuous.

29. A process for producing biofuel from bio-oil comprising:
(a) subjecting biomass to pyrolysis in a biomass conversion unit to form a pyrolyzed biomass containing bio-oil stream and then mixing the pyrolyzed biomass containing bio-oil stream with a hydrotreated stream to form a bio-oil mixture, the hydrotreated stream comprising a stream which, prior to being hydrotreated, has been pretreated to remove materials having a boiling point greater than 650° F.;
(b) removing materials having a boiling point greater than 650° F. from the bio-oil mixture to form a separated bio-oil mixture;
(c) hydrotreating the separated bio-oil mixture of step (b) to produce a deoxygenated stream;
(d) separating from the deoxygenated stream (i) one or more light hydrocarbon streams having a boiling point less than about 650° F.; and (ii) hydrocarbons having a boiling point in excess of about 650° F.; and
(e) generating biofuel from at least a portion of the one or more separated light hydrocarbon streams of step (d).

30. The process of claim 29, further comprising mixing at least a portion of the one or more light hydrocarbon streams of step (d) with the pyrolyzed biomass containing bio-oil stream and forming a bio-oil mixture and then repeating steps (b), (c) and (d).

31. The process of claim 30, wherein the process is a continuous process.

32. The process of claim 29, wherein the bio-oil mixture contains bio-naphtha.

33. The process of claim 30, wherein the one or more light hydrocarbon streams comprise (i) naphtha having a boiling between 150° F. and 350° F. and (ii) a hydrocarbon distillate having a boiling point between from 320° F. to less than 650° F.

34. The process of claim 30, wherein the light hydrocarbon stream is naphtha.

35. The process of claim 1, wherein the temperature in the mixing zone is between 86° F. and 302° F.

36. A process for producing a renewable biofuel from a pyrolyzed biomass containing bio-oil stream comprising:
(a) mixing the pyrolyzed biomass containing bio-oil stream with a hydrotreated stream to render a bio-oil mixture;
(b) removing heavy materials and solids from the bio-oil mixture to render a separated bio-oil, wherein the heavy materials and solids are selected from the group consisting of phenolic oligomers, aldol condensation products, olefins, olefin derivatives, polar nitrogen compounds, char and inorganic solids and mixtures thereof;

(c) deoxygenating the separated bio-oil mixture in a hydrotreater having a catalytic hydrotreating bed;

(d) separating two or more hydrocarbon streams from the deoxygenated stream; and (e) generating the renewable biofuel from at least one of the separated hydrocarbon streams of step (d).

37. A process for producing a renewable biofuel from bio-oil comprising:

(a) pyrolyzing biomass in a biomass conversion unit to render a pyrolyzed biomass stream containing bio-oil and solids;

(b) diluting the concentration of solids in the biomass stream by introducing a hydrotreated stream derived from biomass to render a bio-oil mixture;

(c) separating the solids from the bio-oil mixture to produce a separated bio-oil containing stream;

(d) deoxygenating the separated bio-oil containing stream in a hydrotreater having a catalytic hydrotreating bed;

(e) separating two or more hydrocarbon streams from the deoxygenated stream; and (f) generating the renewable biofuel from at least one of the separated hydrocarbon streams of step (d).

38. The process of claim 37, wherein the solids in the pyrolyzed biomass containing bio-oil stream include coke.

39. The process of claim 1, wherein the hydrotreated bio-oil feed is the partial deoxygenated intermediate.

40. The process of claim 1, wherein the pyrolyzed biomass containing bio-oil stream is derived from catalytic thermolysis.

41. The process of claim 15, wherein the pyrolyzed biomass containing bio-oil stream is derived from catalytic thermolysis.

42. The process of claim 33, wherein the pyrolyzed biomass containing bio-oil stream is derived from catalytic thermolysis.

43. The process of claim 1, wherein a partial deoxygenated intermediate is formed in the hydrotreater and further wherein the separated hydrotreated product removed from the hydrotreater contains the partial deoxygenated intermediate.

* * * * *